US007078678B2

(12) United States Patent
Potvin et al.

(10) Patent No.: US 7,078,678 B2
(45) Date of Patent: Jul. 18, 2006

(54) WAVEFORM GENERATOR ELECTRONICS BASED ON TUNED LC CIRCUITS

(75) Inventors: Lucien Potvin, Kanata (CA); Yves Baribeau, Orleans (CA)

(73) Assignee: Ionalytics Corporation, Ottawa (CA)

( * ) Notice: Subject to any disclaimer, the term of this patent is extended or adjusted under 35 U.S.C. 154(b) by 0 days.

(21) Appl. No.: 10/529,309

(22) PCT Filed: Sep. 23, 2003

(86) PCT No.: PCT/CA03/01444

§ 371 (c)(1),
(2), (4) Date: Mar. 25, 2005

(87) PCT Pub. No.: WO2004/029604

PCT Pub. Date: Apr. 8, 2004

(65) Prior Publication Data

US 2005/0269500 A1 Dec. 8, 2005

Related U.S. Application Data

(60) Provisional application No. 60/413,162, filed on Sep. 25, 2002.

(51) Int. Cl.
*B01D 59/44* (2006.01)

(52) U.S. Cl. ...................................................... 250/286

(58) Field of Classification Search ................ 250/286, 250/281, 287
See application file for complete search history.

(56) References Cited

U.S. PATENT DOCUMENTS 5,354,988 A * 10/1994 Jullien ........................ 250/292
5,801,379 A * 9/1998 Kouznetsov ................ 250/286

* cited by examiner

*Primary Examiner*—Kiet T. Nguyen
(74) *Attorney, Agent, or Firm*—Freedman & Associates

(57) ABSTRACT

Disclosed is an apparatus for generating a periodically varying electrical signal for creating a periodically varying electrical field between electrodes of an ion mobility spectrometer. The apparatus includes an output port. A first tuned circuit is provided for being electrically coupled to an external power source and for, in isolation, providing a first periodically varying electrical signal having a first frequency. The first tuned circuit is coupled to the output port for providing an output electrical signal having a component at the first frequency thereto. A second tuned circuit is provided for being electrically coupled to an external power source and for providing a second periodically varying electrical signal having a second frequency different from the first frequency. The second tuned circuit is coupled to the first tuned circuit for varying the output electrical signal about the first periodically varying electrical signal.

12 Claims, 7 Drawing Sheets

WAVEFORM GENERATOR ELECTRONICS BASED ON TUNED LC CIRCUITS

This application claims the benefit of U.S. Provisional Application No. 60/413,162, filed Sep. 25, 2002.

FIELD OF THE INVENTION

The instant invention relates generally to high field asymmetric waveform ion mobility spectrometry (FAIMS), more particularly the instant invention relates to waveform generator electronics based on tuned LC circuits.

BACKGROUND OF THE INVENTION

High sensitivity and amenability to miniaturization for field-portable applications have helped to make ion mobility spectrometry (IMS) an important technique for the detection of many compounds, including narcotics, explosives, and chemical warfare agents as described, for example, by G. Eiceman and Z. Karpas in their book entitled "Ion Mobility Spectrometry" (CRC, Boca Raton, 1994). In IMS, gas-phase ion mobilities are determined using a drift tube with a constant electric field. Ions are separated in the drift tube on the basis of differences in their drift velocities. At low electric field strength, for example 200 V/cm, the drift velocity of an ion is proportional to the applied electric field strength, and the mobility, K, which is determined from experimentation, is independent of the applied electric field. Additionally, in IMS the ions travel through a bath gas that is at sufficiently high pressure that the ions rapidly reach constant velocity when driven by the force of an electric field that is constant both in time and location. This is to be clearly distinguished from those techniques, most of which are related to mass spectrometry, in which the gas pressure is sufficiently low that, if under the influence of a constant electric field, the ions continue to accelerate.

E. A. Mason and E. W. McDaniel in their book entitled "Transport Properties of Ions in Gases" (Wiley, N.Y., 1988) teach that at high electric field strength, for instance fields stronger than approximately 5,000 V/cm, the ion drift velocity is no longer directly proportional to the applied electric field, and K is better represented by $K_H$, a non-constant high field mobility term. The dependence of $K_H$ on the applied electric field has been the basis for the development of high field asymmetric waveform ion mobility spectrometry (FAIMS). Ions are separated in FAIMS on the basis of a difference in the mobility of an ion at high field strength, $K_H$, relative to the mobility of the ion at low field strength, K. In other words, the ions are separated due to the compound dependent behavior of $K_H$ as a function of the applied electric field strength.

In general, a device for separating ions according to the FAIMS principle has an analyzer region that is defined by a space between first and second spaced-apart electrodes. The first electrode is maintained at a selected dc voltage, often at ground potential, while the second electrode has an asymmetric waveform V(t) applied to it. The asymmetric waveform V(t) is composed of a repeating pattern including a high voltage component, $V_H$, lasting for a short period of time $t_H$ and a lower voltage component, $V_L$, of opposite polarity, lasting a longer period of time $t_L$. The waveform is synthesized such that the integrated voltage-time product, and thus the field-time product, applied to the second electrode during each complete cycle of the waveform is zero, for instance $V_H t_H + V_L t_L = 0$; for example +2000 V for 10 μs followed by −1000 V for 20 μs. The peak voltage during the shorter, high voltage portion of the waveform is called the "dispersion voltage" or DV, which is identically referred to as the applied asymmetric waveform voltage.

Generally, the ions that are to be separated are entrained in a stream of gas flowing through the FAIMS analyzer region, for example between a pair of horizontally oriented, spaced-apart electrodes. Accordingly, the net motion of an ion within the analyzer region is the sum of a horizontal x-axis component due to the stream of gas and a transverse y-axis component due to the applied electric field. During the high voltage portion of the waveform an ion moves with a y-axis velocity component given by $V_H = K_H E_H$, where $E_H$ is the applied field, and $K_H$ is the high field ion mobility under operating electric field, pressure and temperature conditions. The distance traveled by the ion during the high voltage portion of the waveform is given by $d_H = v_H t_H = K_H E_H t_H$, where $t_H$ is the time period of the applied high voltage. During the longer duration, opposite polarity, low voltage portion of the asymmetric waveform, the y-axis velocity component of the ion is $v_L = KE_L$, where K is the low field ion mobility under operating pressure and temperature conditions. The distance traveled is $d_L = v_L t_L = KE_L t_L$. Since the asymmetric waveform ensures that $(V_H t_H) + (V_L t_L) = 0$, the field-time products $E_H t_H$ and $E_L t_L$ are equal in magnitude. Thus, if $K_H$ and K are identical, $d_H$ and $d_L$ are equal, and the ion is returned to its original position along the y-axis during the negative cycle of the waveform. If at $E_H$ the mobility $K_H > K$, the ion experiences a net displacement from its original position relative to the y-axis. For example, if a positive ion travels farther during the positive portion of the waveform, for instance $d_H > d_L$, then the ion migrates away from the second electrode and eventually will be neutralized at the first electrode.

In order to reverse the transverse drift of the positive ion in the above example, a constant negative dc voltage is applied to the second electrode. The difference between the dc voltage that is applied to the first electrode and the dc voltage that is applied to the second electrode is called the "compensation voltage" (CV). The CV prevents the ion from migrating toward either the second or the first electrode. If ions derived from two compounds respond differently to the applied high strength electric fields, the ratio of $K_H$ to K may be different for each compound. Consequently, the magnitude of the CV that is necessary to prevent the drift of the ion toward either electrode is also different for each compound. Thus, when a mixture including several species of ions, each with a unique $K_H/K$ ratio, is being analyzed by FAIMS, only one species of ion is selectively transmitted to a detector for a given combination of CV and DV. In one type of FAIMS experiment, the applied CV is scanned with time, for instance the CV is slowly ramped or optionally the CV is stepped from one voltage to a next voltage, and a resulting intensity of transmitted ions is measured. In this way a CV spectrum showing the total ion current as a function of CV, is obtained.

In FAIMS, the optimum dispersion voltage waveform for obtaining the maximum possible ion detection sensitivity on a per cycle basis takes the shape of an asymmetric square wave with a zero time-averaged value. In practice this asymmetric square waveform is difficult to produce and apply to the FAIMS electrodes because of electrical power consumption considerations. For example, without a tuned circuit the power that is required to drive a capacitive load of capacitance C, at frequency f, with a peak voltage V and a 1:1 duty cycle square wave, is $V^2 fC$. Accordingly, if a square wave at 750 kHz, 4000 V peak voltage 1:1 duty cycle is applied to a 20 picofarad load, the theoretical power consumption will be 480 Watts produced by the sum of the squares of the voltage changes on the capacitive load of $4000^2+4000^2$ multiplied by f*C. If, on the other hand, a waveform is applied via a tuned circuit with Q factor (Bandwidth 3 dB/Frequency) of 200, the power consumption is reduced to less than 2.5 Watts. Theoretically the power is P(cos Θ) where Θ is the angle between the current and the voltage applied to the capacitive load, and P is $2V^2fC$. This power consumption approaches zero if the current and voltage are out of phase by 90 degrees, as they would be in a perfectly tuned LC circuit with ideal components. Similarly, if the waveform is asymmetrical with duty cycle of 2:1, as for example in a FAIMS application, then the theoretical power consumption is reduced to 333 Watts, produced by the sum of squares of the voltage changes on the capacitive load of $4000^2+2000^2+(2000^2-1333^2)$ times f*C.

Since a tuned circuit cannot provide a square wave, an approximation of a square wave is taken as the first terms of a Fourier series expansion. One approach is to use:

$$V(t)=\tfrac{2}{3}D\sin(\omega t)+\tfrac{1}{3}D\sin(2\omega t-\pi 2) \quad (1)$$

where V(t) is the asymmetric waveform voltage as a function of time, D is the peak voltage (defined as dispersion voltage DV), and ω is the waveform frequency in radians/sec. The first term is a sinusoidal wave at frequency ω, and the second term is a sinusoidal wave at double the frequency of the first sinusoidal wave, 2ω. Alternatively, the second term is represented as a cosine, without the phase shift of π2.

In practice, both the optimization of the LC tuning and maintenance of the exact amplitude of the first and second applied sinusoidal waves and the phase angle between the two waves is required to achieve long term, stable operation of a FAIMS system powered by such an asymmetric waveform generator. Accordingly, feedback control is required to ensure that the output signal is stable and that the correct waveform shape is maintained.

In U.S. Pat. No. 5,801,379, which was issued on Sep. 1, 1998, Kouznetsov teaches a high voltage waveform generator having separate phase correction and amplitude correction circuits. This system uses additional components in the separate phase correction and amplitude correction circuits, thereby increasing complexity and increasing the cost of manufacturing and testing the devices. Furthermore, this system cannot be implemented in the control software, making it difficult to vary certain operating parameters during use.

It is an object of the instant invention to provide an asymmetric waveform generator based on LC tuning electronics that overcomes the limitations of the prior art.

SUMMARY OF THE INVENTION

In accordance with an aspect of the instant invention there is provided an apparatus for generating a periodically varying electrical signal for creating a periodically varying electrical field between electrodes of an ion mobility spectrometer, comprising: an output port; a first tuned circuit for being electrically coupled to an external power source and for, in isolation, providing a first periodically varying electrical signal having a first frequency, the first tuned circuit coupled to the output port for providing an output electrical signal having a component at the first frequency thereto; and, a second tuned circuit for being electrically coupled to an external power source and for providing a second periodically varying electrical signal having a second frequency different from the first frequency, the second tuned circuit coupled to the first tuned circuit for varying the output electrical signal about the first periodically varying electrical signal.

In accordance with another aspect of the instant invention there is provided an electromagnetic transformer comprising: a secondary winding comprising a plurality of turns of a first wire wound defining a core and having an approximately uniform spacing between adjacent turns; a first primary winding comprising at least one turn of a second wire wound around the core and spaced apart from both the core and the secondary winding; and, a second primary winding comprising at least one turn of a third wire wound around the core in parallel with the first primary winding and spaced apart from both the core and the secondary winding.

BRIEF DESCRIPTION OF THE DRAWINGS

Exemplary embodiments of the invention will now be described in conjunction with the following drawings, in which similar reference numbers designate similar items.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

As is noted above, the waveform that is applied in FAIMS is a combination of two sinusoidal waves of frequency omega (ω) and two times omega (2ω)). The two sinusoidal waves are of amplitudes that differ by a factor of two and that are offset by a phase shift of π/2, resulting in a waveform that is defined by, for example, Equation 1, below:

$$V(t)=\tfrac{2}{3}D\sin(\omega t)+\tfrac{1}{3}D\sin(2\omega t-\pi/2) \quad (1)$$

This simple equation is the equivalent of the first two terms of a Fourier series, which describes a square wave with a 2:1 duty cycle.

Figure 1:
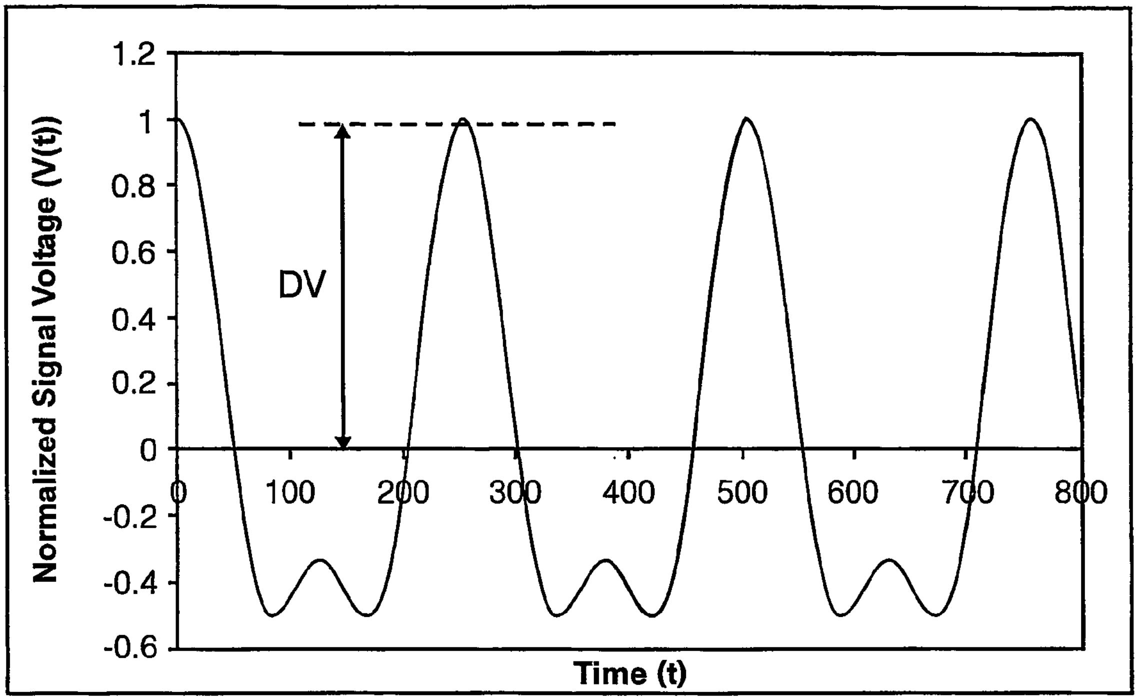
FIG. 1 shows a plurality of cycles of an asymmetric waveform that is formed as a combination of first and second sinusoidal waves of frequency ω and 2ω, respectively.

In practice the application of two sinusoidal waves of frequency ω and 2ω is used to generate a waveform with the shape shown at FIG. 1. The sinusoidal wave of frequency 2ω is applied with a 90 degree phase shift and amplitude that is 50% of the amplitude of the sinusoidal wave of frequency ω. The peak voltage D, which is equal to the dispersion voltage, DV, is normalized to one as shown at FIG. 1.

Figure 2A:
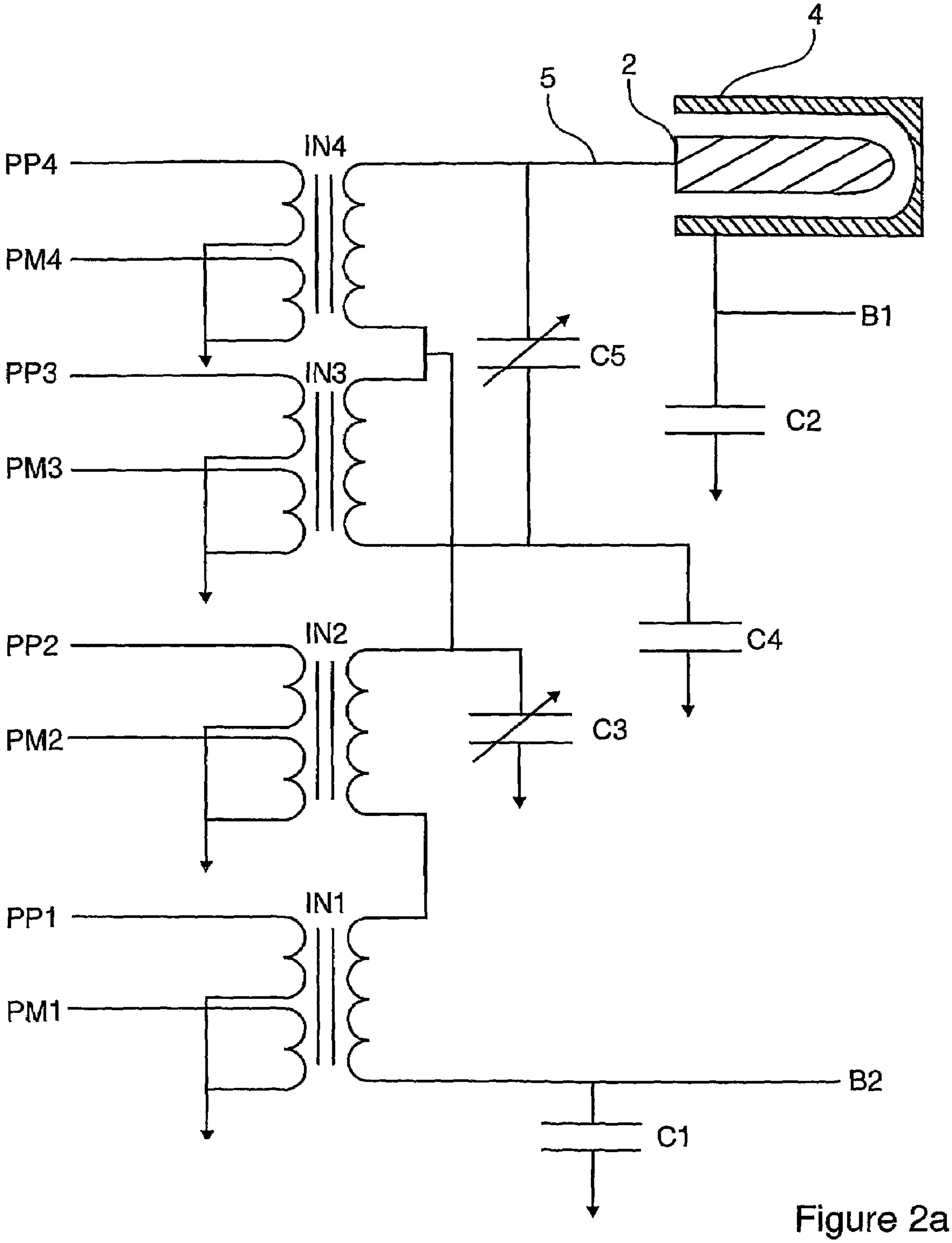
FIG. 2*a* shows a simplified circuit diagram of an electronic circuit for adding two waves of different frequencies according to an embodiment of the instant invention.

Referring now to FIG. 2*a*, shown is a simplified circuit diagram of an electronic circuit for adding two waves of different frequencies according to an embodiment of the instant invention, and for delivering the voltage through a conductive port 5 to one of the electrodes of FAIMS. Four inductances, IN1, IN2, IN3 and IN4 in a novel arrangement are used to drive a capacitive load FAIMS including inner electrode 2 and outer electrode 4. Power is supplied to each one of the inductances IN1, IN2, IN3 and IN4 through a primary winding by a pulsed input signal. In the embodiment of FIG. 2*a*, pulsed input drive signals are used because they can accurately be generated by digital circuits, providing a high degree of control of the timing, frequency, and phase relations between the signals. For instance, PP1 is a pulse in the positive polarity (plus) applied to the primary of IN1 and PM1 is a pulse in the negative polarity (minus) also applied to the primary of IN1 but out of phase with PP1. For illustrative purposes, each of the positive-going and negative-going pulses is applied to a separate primary winding wound onto inductor IN1. Similarly, a series of positive inputs PPn and negative inputs PMn are applied to inductors INn, where n=1 to 4 in FIG. 2*a*. Each of the inductors IN1, IN2, IN3 and IN4 is wound with a secondary winding that becomes part of an LC tuned circuit along with an output capacitive load. Since the LC tuned circuit is not a perfect oscillator, some energy is required to sustain oscillations. The loss rate is matched by the supply of power introduced through the primary windings on inductors IN1 through IN4.

Inductors IN1 and IN2 are arranged in series with each other, and the input pulses of a first frequency are approximately identical and in phase. In other words, in this example, PP1 and PP2 are identical, and PM1 and PM2 are identical, however the positive-going (PPn) and negative-going (PMn) pulses are applied alternatively in a push-pull manner, not simultaneously to the inductors. The combined inductances of IN1 and IN2 are selected to oscillate in tuned resonance with a capacitance of C3 combined in parallel with the capacitance of the rest of the circuit attached to the secondary windings of IN3 and IN4, namely C4, and FAIMS load plus all other stray capacitances throughout the circuit. C1 and C2 do not contribute to the tuning as they are bypass capacitances for the DC voltages B1 and B2. C5 does not contribute to the tuning of IN1 and IN2 as it is balanced across IN3 and IN4. For example, if the combined inductance of IN1 and IN2 is 0.45 mH then the circuit will oscillate at 750 kHz if the capacitance of C3 in parallel with the rest of the circuit is 100 pF.

The secondary windings of IN3 and IN4 are in series, but the center tap between these inductors is attached to the secondary of IN1 and IN2. This means that the combined oscillation of the IN3 and IN4 is around the floating voltage provided from IN1 and IN2. It is therefore possible for IN3 and IN4 to oscillate at a second frequency that is independent of the first frequency of oscillation of IN1 and IN2. The secondary windings of inductors IN3 and IN4 are coupled with three capacitors in a symmetrical arrangement. One capacitor, C5, is parallel to the inductors IN3 and IN4, whereas the other two capacitors, C4 and the FAIMS load, are each in series with ground or with some other dc potential, for example B1 in FIG. 2*a*. Since capacitors C4 and the FAIMS load are referenced to the AC ground potential, their respective values must be equal for the resonant circuit at IN3 and IN4 to be balanced, i.e. for the same instantaneous and opposite polarity voltage to appear at the terminals of C5 relative to the center tap between IN3 and IN4. For example, IN3 and IN4 oscillate at 1500 kHz if the total capacitance, including stray capacitance, is 25 pF and the inductance is 0.45 mH. Note that the series arrangement of the FAIMS load and C4 in FIG. 2*a* minimizes the apparent capacitance of the FAIMS load. For example, if the FAIMS load, electrodes 2 and 4 in FIG. 2*a*, is approximately 25 pF, and C4 is approximately 25 pF (the total series combination is 12.5 pF), with appropriate selection of C5 (to 12.5 pF) the net capacitance coupled to the inductors IN3 and IN4 is 25 pF.

In FIG. 2*a* there are two inputs for dc bias voltages B1 and B2. B1 establishes the dc offset voltage applied to the outer electrode 4 of FAIMS. The dc bias voltage may be used to establish a desired voltage difference between FAIMS and some other detector device such as the input plate of a not illustrated mass spectrometer. The dc bias voltage B2 is used to establish the dc offset voltage applied to the inner electrode 2 of FAIMS. The asymmetric waveform is superimposed upon this dc bias voltage. Also, the compensation voltage, defined by the difference between the dc voltages applied to the inner and outer electrodes of FAIMS, is established by the difference in dc voltage of B1 and B2.

Tuning of IN3 and IN4, in concert with their capacitive load including C5, C4 and the FAIMS load, is made possible through adjustment of C5. Simultaneously, adjustment of C3 is required to ensure that the tuning of IN1 and IN2 with the remaining circuit is retained. Advantageously the computer control of this circuit is possible by using adjustable capacitors whose capacitance is changed by motors activated electronically.

Advantageously, the two frequencies applied to the two tuned circuits may be adjusted independently with the input signal provided to the other of the two tuned circuits disabled or fixed. In other words, if the inputs PP1, PP2, PM1 and PM2 are all reduced to zero, the application of PP3, PP4, PM3, and PM4 activates the LC oscillation at a frequency defined by the values of the inductances and capacitances attached to IN3 and IN4. The tuning of this part of the circuit is adjusted by changing the input frequency and voltages applied to PP3, PP4, PM3, and PM4, as well as by adjusting the variable capacitor C5. Similarly, with the inputs PP3, PP4, PM3, and PM4 set to zero, the oscillator defined by IN1, IN2 and their capacitive load, is activated by applying PP1, PP2, PM1 and PM2. Adjustment of this LC oscillation is achieved by changing the voltage and frequency applied to PP1, PP2, PM1 and PM2, and by adjusting variable capacitor C3. If both oscillators are independently optimized to maximum efficiency, quality value Q, the phase shift between the oscillations are adjusted by digital control of the phase difference between the PP1, PP2, PM1, PM2 relative to PP3, PP4, PM3, PM4 inputs.

Optionally, in a microprocessor controlled system it is not necessary to zero the other frequency to tune each resonant circuit. In this case, the data processing system extracts the amplitude of each frequency from the combined waveform.

Of course, a person skilled in the art will appreciate that optionally the sinusoidal drive waveforms are applied to a not illustrated conventional version of primary coil on the inductors IN1, IN2, IN3 and IN4. For maximum control over the drive waveforms, additional electronics, optionally including digital synthesis of the sinusoidal waveforms, may be also utilized.

Figure 2B:
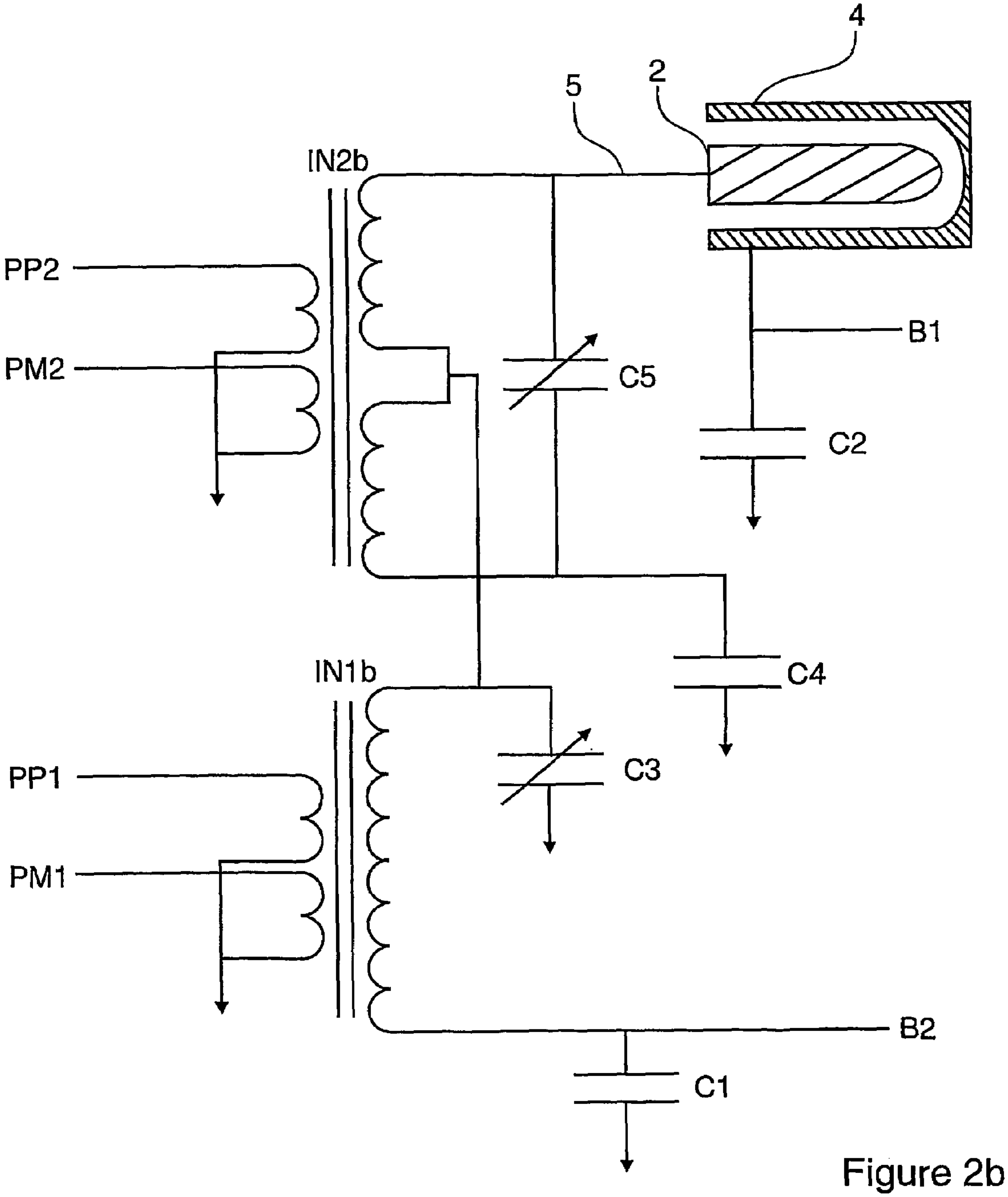
FIG. 2*b* shows a simplified circuit diagram of an electronic circuit for adding two waves of different frequencies according to another embodiment of the instant invention.

Referring now to FIG. 2*b*, shown is a simplified circuit diagram of an electronic circuit for adding two waves of different frequencies according to another embodiment of the instant invention, and for delivering the voltage through a conductive port 5 to one of the electrodes of FAIMS. Elements labeled with the same numerals have the same function as those illustrated at FIG. 2*a*. In FIG. 2*b*, a single inductor IN1*b* replaces the two inductors IN1 and IN2 running at a first frequency. Similarly, a single inductor IN2*b* replaces the duplicated series inductors IN3 and IN4 operating at a second frequency. The secondary windings on the inductors IN1*b* and IN2*b* are analogous to those described with reference to FIG. 2*a*. The associated capacitors and the FAIMS load electrodes 2 and 4 are the same in both figures.

Figure 3A:
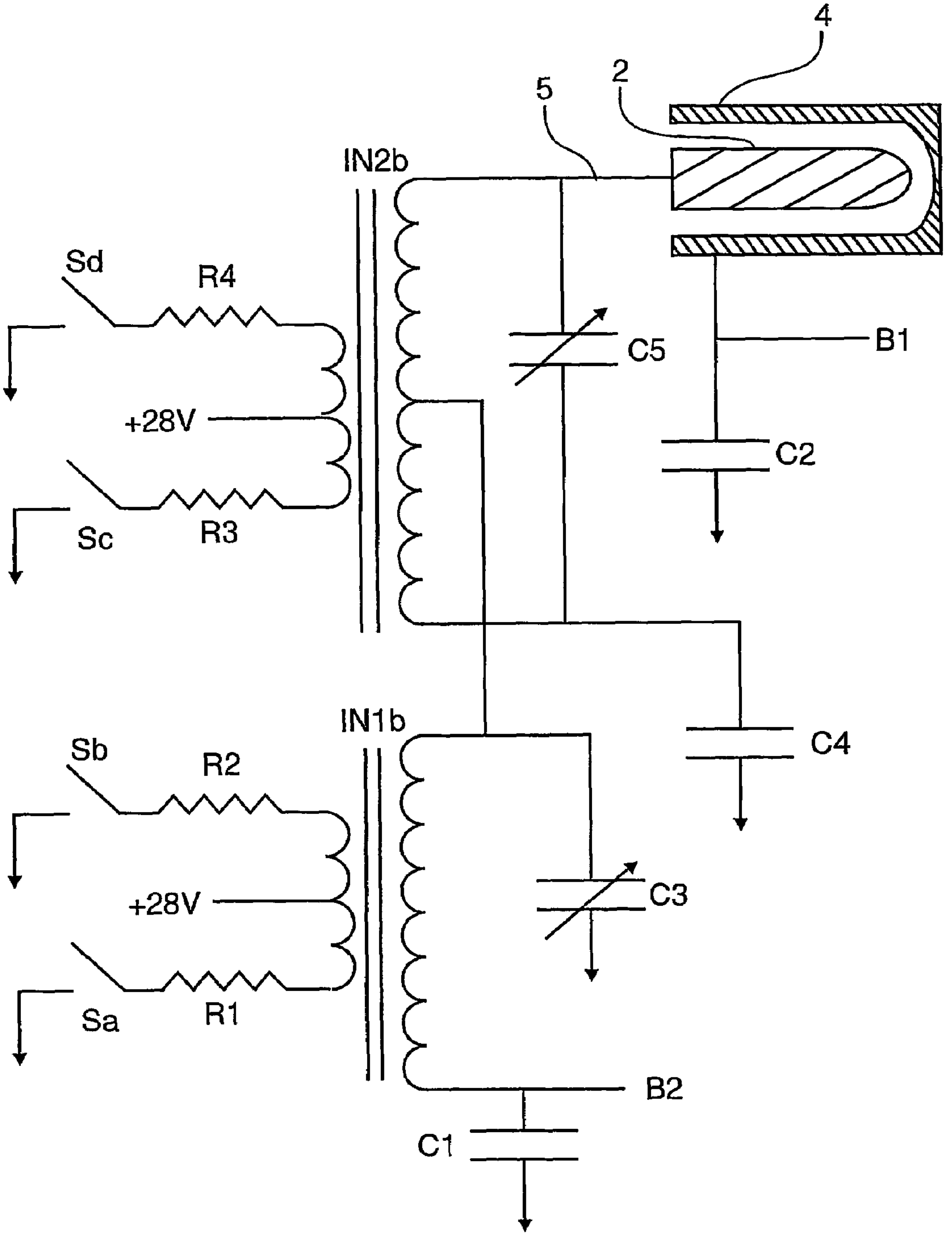
FIG. 3*a* shows a simplified circuit diagram of an electronic circuit for adding two waves of different frequencies according to yet another embodiment of the instant invention.
Figure 3B:
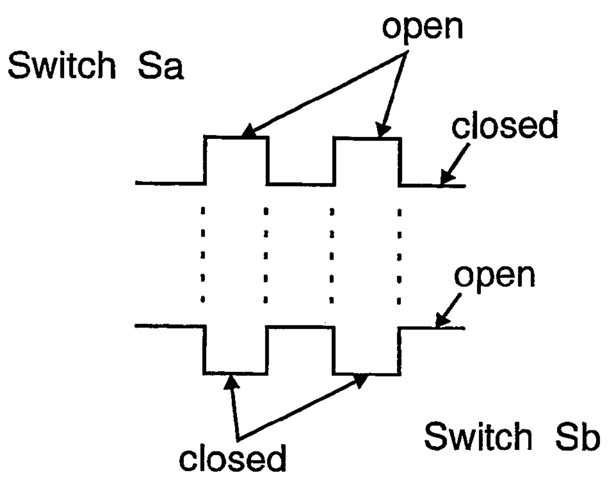
FIG. 3*b* shows a timing diagram for applying pulses to the electronic circuit of FIG. 3*a;*

Referring now to FIG. 3*a*, shown is a simplified circuit diagram of an electronic circuit for adding two waves of different frequencies according to yet another embodiment of the instant invention. Elements labeled with the same numerals have the same function as those illustrated at FIG. 2*a*. In FIG. 3*a*, a single inductor IN1*b* replaces the two inductors IN1 and IN2 running at a first frequency. Similarly, a single inductor IN2*b* replaces the duplicated series inductors IN3 and IN4 operating at a second frequency. The secondary windings on the inductors IN1*b* and IN2*b* are analogous to those described with reference to FIG. 2*a*. The associated capacitors and the FAIMS load electrodes 2 and 4 are the same in both figures. FIG. 3*a* also illustrates an optional approach for application of the driving currents to initiate and maintain the oscillation in the tuned LC circuit. In FIG. 3*a* the primary winding consists of a center-tapped winding. The center tap is coupled to a dc power supply (for example +28 volts is shown at FIG. 3*a*). The voltage available at this terminal affects the amplitude of the wave generated by the particular oscillator. The two portions of the primary winding are alternately connected to ground potential through switches. The primary winding of inductor IN1*b* is operated at a first frequency by alternately grounding the primary winding through switches Sa and Sb, only one of which is closed at any time, as shown in the timing diagram at FIG. 3*b*. When Sa is closed, current runs through one half of the primary winding in a first direction. At a later time, Sa is opened and Sb is closed so as to drive current through the other half of the primary winding, but in a second direction. In a practical implementation, a dead zone is required between the opening of one switch and the closing of the next one, i.e. break-before-make operation. As a result of the changing magnetic fields thus induced in IN1*b*, an oscillating high voltage potential appears on the secondary winding, assuming that the drive frequency is such that an LC oscillation takes place. The primary winding of IN2*b* is operated in a similar manner to that of IN1*b* except that the frequency of oscillation is different and a phase difference exists between the oscillations induced in IN1*b* and IN2*b*. The switches Sa, Sb, Sc, and Sd shown in FIG. 3*a* are preferably electronic. Optionally, another circuit is used to generate an input signal to IN1*b* and IN2*b* similar to that generated through the use of the electronic switches shown in FIG. 3*a*. For example, a conventional primary coil, with a sinusoidal voltage applied can be used, if appropriate control of voltage, frequency and phase is implemented. The example in FIG. 3*a* uses digitally controlled switches as an illustration of a simple interface to a digital control circuit. Optionally, another known method of delivering an input driver oscillation for the primary coils on IN1*b* and IN2*b* is used.

Figure 4A:
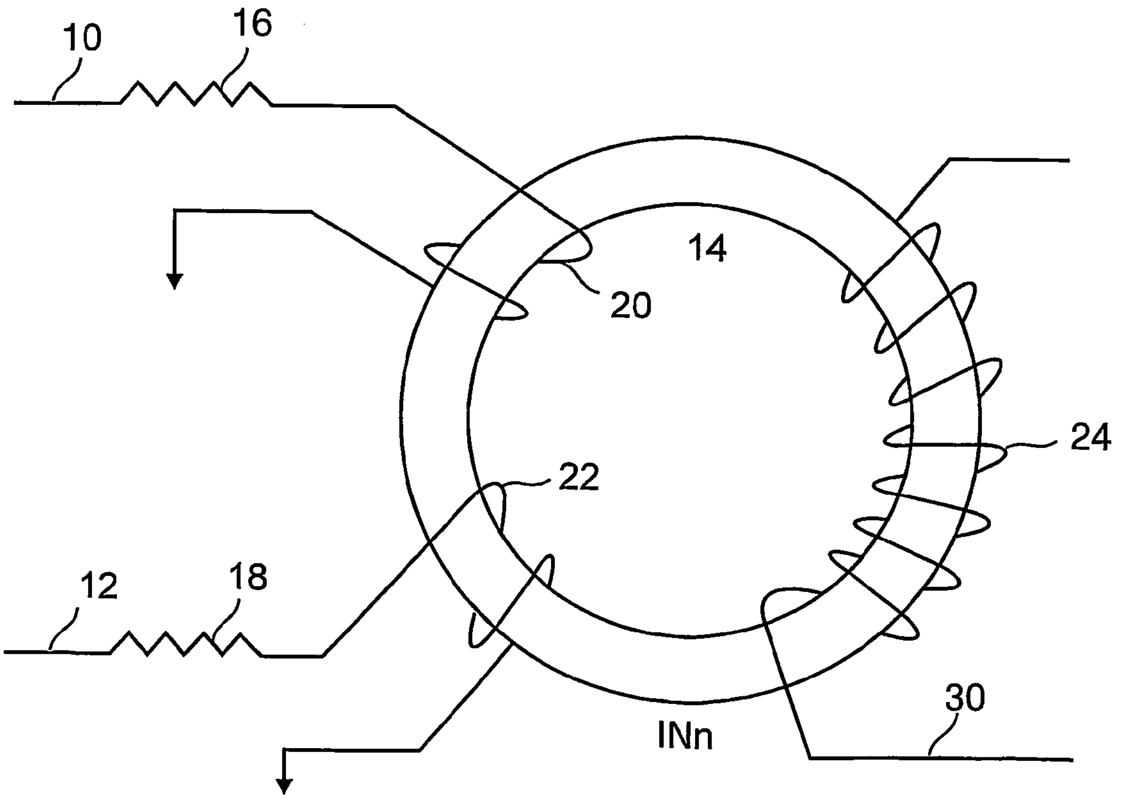
FIG. 4*a* is a simplified diagram of an inductor suitable for use with the electronic circuits of FIG. 2*a*, FIG. 2*b*, and FIG. 3*a;*
Figure 4B:
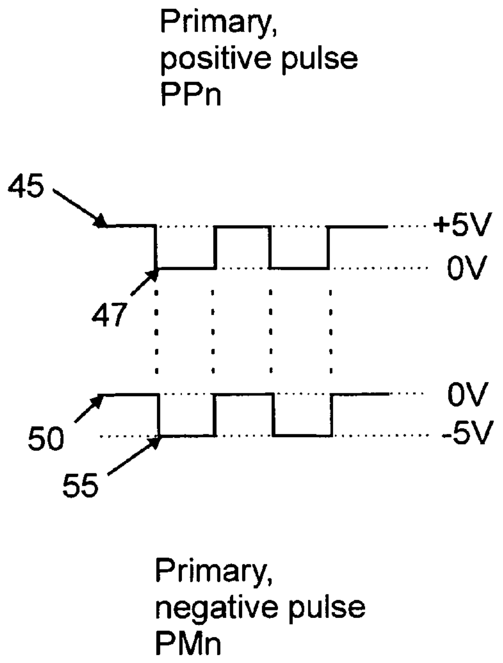
FIG. 4*b* shows a timing diagram for applying pulses to the inputs of the inductor of FIG. 4*a;*

FIG. 4*a* illustrates the fundamentals of the windings of inductors IN1, IN2, IN3 and IN4 that were discussed in relation to the circuit shown at FIG. 2*a*. A similar approach is taken for IN1*b* and IN2*b* in FIG. 3*a* but using one center-tapped primary winding rather than two completely independent primary windings as shown in FIG. 2*a* and FIG. 2*b*. Referring still to FIG. 4*a*, primary winding 20 is coupled to an input 10 and primary winding 22 is coupled to an input 12, to which are applied a primary positive pulse (PP1 in FIG. 2*a*) and a primary negative pulse (PM1 in FIG. 2*a*), respectively. Referring also to FIG. 4*b*, the primary positive pulse is composed of a square wave with a low side 47 near zero volts and a high side 45 at an adjustable value (for example +5 V as shown at FIG. 4*b*). The primary negative pulse is composed of a square wave with a high side 50 near zero volts and negative side 55 at an adjustable voltage (for example −5 V as shown at FIG. 4*b*). As shown in the timing diagram of FIG. 4*b*, the pulses are applied in an alternating fashion, wherein the voltage 45 is applied on the primary positive pulse while voltage 50 is applied on the primary negative pulse. Similarly, the voltage 47 is applied on the primary positive pulse while voltage 55 is applied on the primary negative pulse. The effect is to create magnetic fields in the inductive core 14, which alternately changes direction during application of pulses in the positive polarity through input 10 and negative polarity through input 12. The pulses are driven through load resistors 16 and 18 on the positive and negative sides, respectively. The load resistors 16 and 18 ensure a minimum source impedance for the driver circuit. This source impedance multiplied by the square of the transformer turns ratio appears as a load in parallel with the secondary tuned circuit. This extra load reflected from the primary source impedance is driven by the LC tuned circuit, thereby reducing the real voltage amplitude output of the combined LCR circuit. If one chooses the circuit parameters so that R is equal to the tuned impedance of LC, the output voltage is one half of a similar free running (or unloaded) LC tuned circuit. The currents in primary windings 20 and 22 result in magnetic fields in core 14 that also induce electrical currents in the secondary winding 24. The voltage induced in the secondary winding is related to the number of times the secondary winding 24 is wrapped around the core 14 relative to the number of times that primary winding 20 or 22 is wrapped around core 14. Referring again to FIG. 2*a*, the secondary windings 24 of inductors INn are linked to a capacitive load. Preferably, the inductance of the secondary winding 24 wrapped around core 14 is suitable for a tuned LC oscillation with the capacitive load.

While FIG. 4*a* illustrates schematically the concepts used in the present invention, a novel approach was discovered to reach the performance required for the FAIMS application. The FAIMS application requires a high voltage (for example 4000 Volt peak) into an approximately 20 pF load. Minimization of the power consumption also benefits from an LC oscillator with a high quality factor (Q) of over 200.

Figure 5:
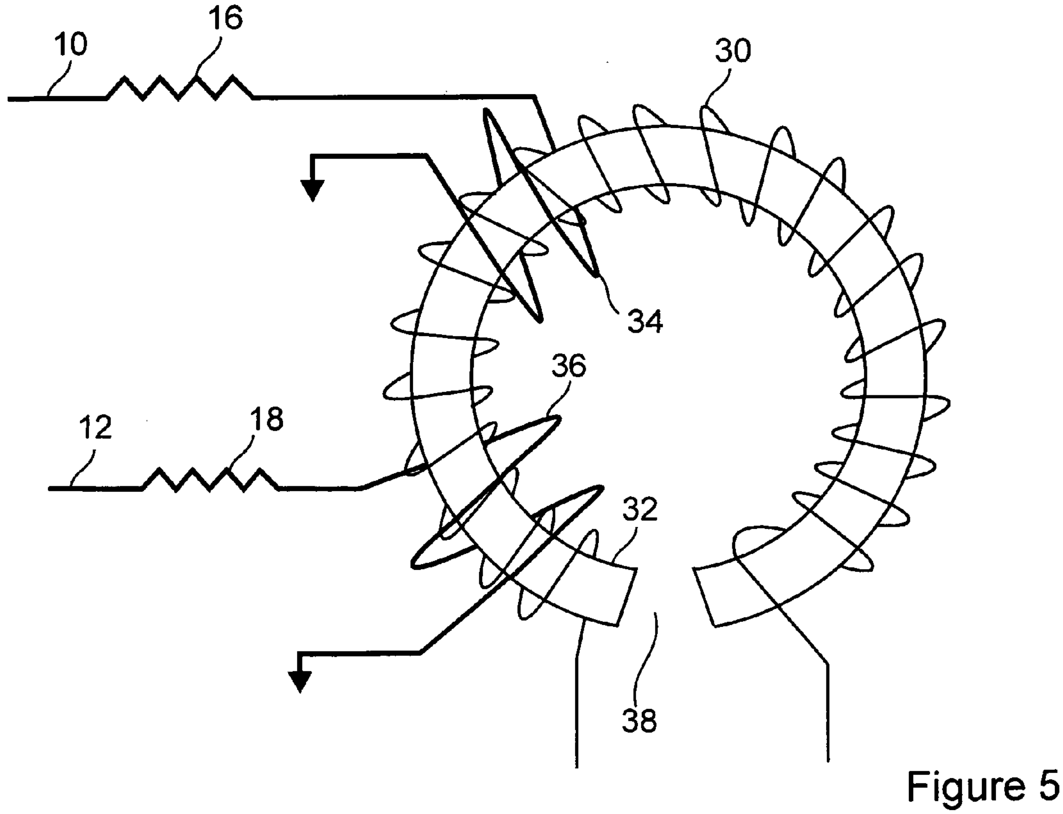
FIG. 5 shows a simplified diagram of another inductor suitable for use with the electronic circuits of FIG. 2*a*, FIG. 2*b*, and FIG. 3*a*; and, FIG. 6 shows a simplified diagram of yet another inductor suitable for use with the electronic circuits of FIG. 2*a*, FIG. 2*b*, and FIG. 3*a*.

FIG. 5 illustrates two improvements of the embodiment shown at FIG. 4*a*. First, the secondary winding 30 is wrapped along a significant portion of the core 32. This permits an increased number of turns of the secondary winding 30 to be placed on the core 32, relative to the arrangement illustrated at FIG. 4*a*. Each turn of the secondary winding 30 is spaced-apart from adjacent turns of the secondary winding 30 in a direction along the length of the core 32. The set of parallel primary windings 34 and 36 from the drive circuit are wrapped external to the turns of the secondary winding 30, and are spaced away from the core 32 and from the secondary winding 30 by an air gap to prevent electrical discharge and capacitive coupling between the primary windings (either 34 or 36) and the secondary winding 30. The second improvement is a modification of the core 32. A segment of the core 32 is removed to leave a gap 38. Alternatively, the core 32 is formed initially into a substantially C-shape, leaving a space between opposite ends of the core 32 that defines the gap 38. This gap 38 is required in order to prevent electrical discharge and electric field leakage through the core material between the two ends of the secondary windings 30 which may have significant voltage differences between them. The gap 38 also minimizes the heat generated in the core material in the region between the two ends of the secondary windings. Heat is generated by electrical leakage and power losses in the material between the two ends of the secondary windings and through the core. The gap 38 minimizes this power loss. The core material is chosen not to have a high magnetic permeability, this is necessary for the number of turns and the inductance requirements of the application. The material also exhibits low losses at the frequencies of interest. Therefore the gap 38 does not significantly change the inductance of the core 32 and the secondary winding 30.

Figure 6:
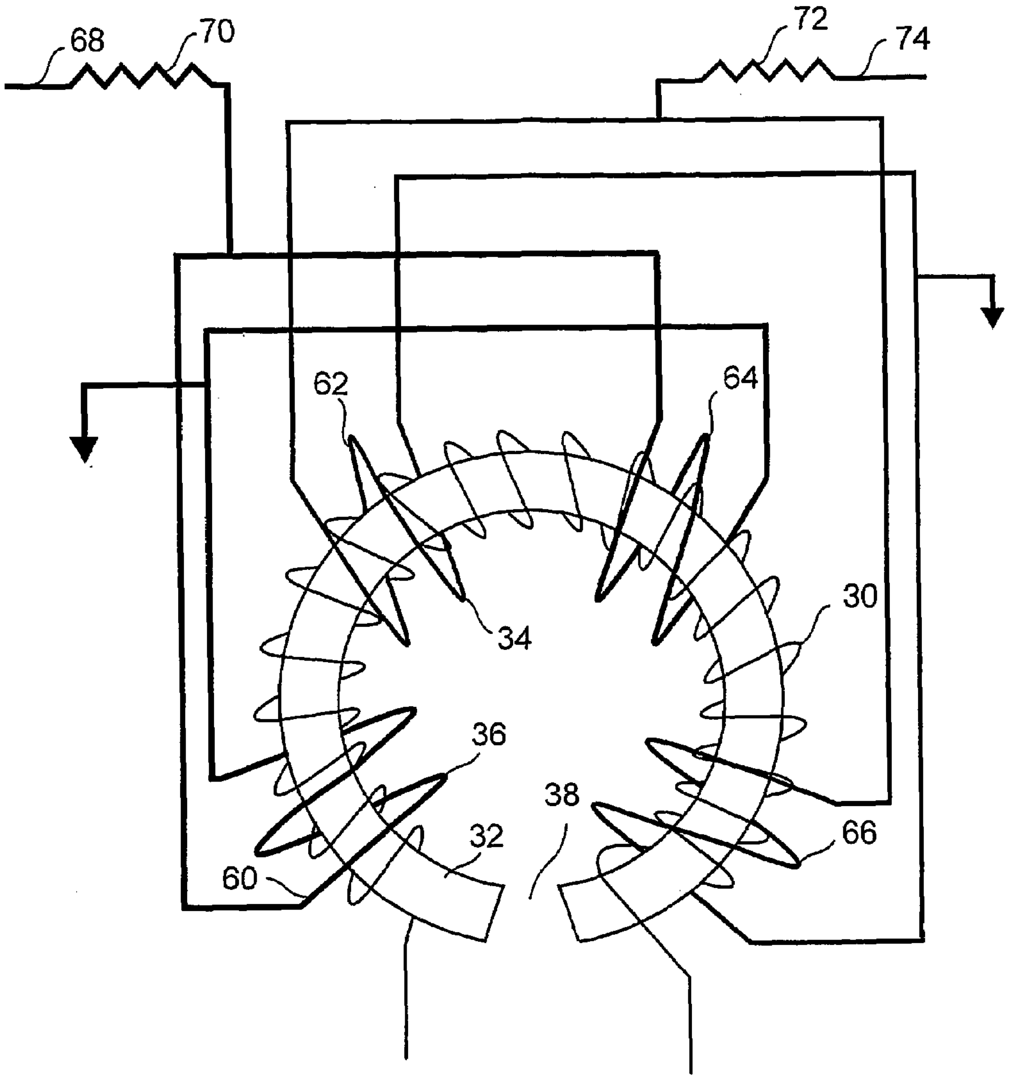

FIG. 6 illustrates an additional improvement of the schematic shown at FIG. 5. In particular, the system shown at FIG. 5 is limited in effectiveness because the ability of the primary windings 34 and 36 to induce magnetic fields in the core 32 is limited by (i) the small number of turns and (ii) the limited coverage of the core 32. The improvement is realized by running a second, or optionally more, set of parallel primary windings at different locations around the core 32. In FIG. 6, the primary windings are 60, 62, 64 and 66. The primary positive pulse is applied to the primary windings at 68 in FIG. 6. After load resistance 70, the primary windings 60 and 64 are wound in parallel around the core 32. Similarly, the primary windings for the negative pulse input are wound in parallel at 62 and 66 after load resistance 72 and are powered from the primary negative pulse applied to wire 74. This achieves two purposes. First, the magnetic field induced in the core 32 is higher, and therefore the coupling between the primary and the core is more efficient, in part because there are more primary windings around the core 32. Since the magnetic permeability of the core material is low (due to circuit requirements as mentioned above) the magnetic lines are not contained easily within the core material and the coupling factor between the primary windings and the core material is poor, adding a number of parallel primary windings significantly improves the coupling factor. Secondly, it is an advantage that this efficiency of applying the input pulse is increased without the need to wrap further turns of the secondary winding 30 around the core 32. In some cases additional turns on the secondary is impractical because of the small size of the core 32 and it is important to achieve a high ratio of output turns to input turns to induce as high output voltage as possible on the secondary winding 30. In other words, using the approach of parallel application of the primary winding shown in FIG. 6, the voltage induced in the secondary winding 30 approaches the theoretical limit of the transformer design due to the improved coupling factor in the primary circuit. The number of turns of the primary winding appears to have been increased significantly without having changed the transformer turns ratio. Each of the primary windings, because they are wound in parallel, continues to behave as a small number of turns and the ratio of turns on the primary winding to the turns on the secondary winding is unchanged.

Advantageously, a plurality of primary windings 60, 62 and 64, 66 as shown at FIG. 6 increases the efficiency of coupling to the core 32. The large diameter turns in the primary windings minimize the possibility of discharge from the primary winding to either the core 32 or to the secondary winding 30. Furthermore, the large diameter turns of the primary windings shown at FIG. 6 minimize the capacitance between the primary windings and the turns of the secondary winding on the core 32. It would appear that this decreased capacitance would be achieved at the expense of the ability of the primary winding to induce a magnetic field in the core 32. In fact, this expected effect is minimized. Although the turns of the primary windings 60, 62, 64 and 66 in FIG. 6 are further from the core 32, the wire of the primary winding is longer, the enclosed area is larger but the total magnetic flux remains the same (1 turn carrying the same current). In the instant example, the chosen core magnetic permeability for this application is ~8 times that of air so the magnetic flux is mostly concentrated in the core material rather than the surrounding air space. Accordingly, a high efficiency of coupling the primary windings and secondary winding is achieved by providing a plurality of parallel primary windings, and a low capacitance is maintained by providing large diameter primaries that are wound at various locations around the core 32.

Beyond three or four parallel sets of primary windings wound around the core 32, the efficiency of coupling does not further increase significantly since the coupling is over 90% with three sets of parallel primary windings. Additional sets of parallel primary windings (beyond three or four) also have the detrimental effect of increasing the stray capacitance between the primary and secondary windings.

Advantageously, the cut toroid-shaped core results in a small instrument package. Optionally, the core is provided in the form of a bar, or another suitable shape.

Numerous other embodiments may be envisaged without departing from the spirit and scope of the instant invention.

What is claimed is:

1. An apparatus for generating a periodically varying electrical signal for creating a periodically varying electrical field between electrodes of an ion mobility spectrometer, comprising:

an output port;

a first tuned circuit for being electrically coupled to an external power source and for, in isolation, providing a first periodically varying electrical signal having a first frequency, the first tuned circuit coupled to the output port for providing an output electrical signal having a component at the first frequency thereto; and, a second tuned circuit for being electrically coupled to an external power source and for providing a second periodically varying electrical signal having a second frequency different from the first frequency, the second tuned circuit coupled to the first tuned circuit for adding a component at the second frequency to the output electrical signal.

2. An apparatus according to claim 1, wherein the first tuned circuit comprises:

at least a first inductor having a primary winding and a secondary winding;

a capacitive load coupled to the secondary winding of the at least a first inductor and including a first tunable capacitance and electrodes of an ion mobility spectrometer; and, a load resistor coupled to the primary winding.

3. An apparatus according to claim 2, wherein the second tuned circuit comprises at least a second inductor having a primary winding and a secondary winding, and wherein the secondary winding of the at least a second inductor is electrically coupled to a center-tap of the secondary winding of the at least a first inductor.

4. An apparatus according to claim 3, comprising switches electrically coupled to the apparatus for in a first switched mode providing current along a first direction through the primary windings of each one of the at least a first inductor and the at least a second inductor, and for in a second other switched mode providing current along a second other direction through the primary winding of each one of the at least a first inductor and the at least a second inductor.

5. An apparatus according to claim 2, wherein the at least a first inductor comprises two inductors coupled in series one to the other.

6. An apparatus according to claim 5, wherein the second tuned circuit comprises two inductors coupled in series one to the other, and wherein the two inductors of the second tuned circuit are electrically coupled to a center-tap between the two inductors of the first tuned circuit.

7. An apparatus according to claim 2, wherein the second tuned circuit comprises two inductors coupled in series one to the other, and wherein the two inductors of the second tuned circuit are electrically coupled to a center-tap on the secondary winding of the at least a first inductor of the first tuned circuit.

8. An apparatus according to claim 2, wherein the load resistor is selected to ensure approximately sinusoidal variations in electrical currents in the primary winding.

9. An apparatus according to claim 8, wherein the load resistor is selected such that a desired voltage of the first periodically varying electrical signal is obtained with approximately minimum consumption of power from the external power source.

10. An apparatus according to claim 2, comprising switches electrically coupled to the apparatus for in a first switched mode providing current along a first direction through the primary winding of the at least a first inductor, and for in a second other switched mode providing current along a second other direction through the primary winding of the at least a first inductor.

11. An apparatus according to claim 1, wherein the first frequency and the second frequency differ by a factor of substantially two.

12. An apparatus according to claim 1, comprising a pair of electrodes disposed for forming an analyzer region therebetween.

* * * * *